Dec. 29, 1964   H. F. SNIDER   3,163,043
THERMALLY RESPONSIVE CONTROL APPARATUS
Filed Oct. 19, 1961
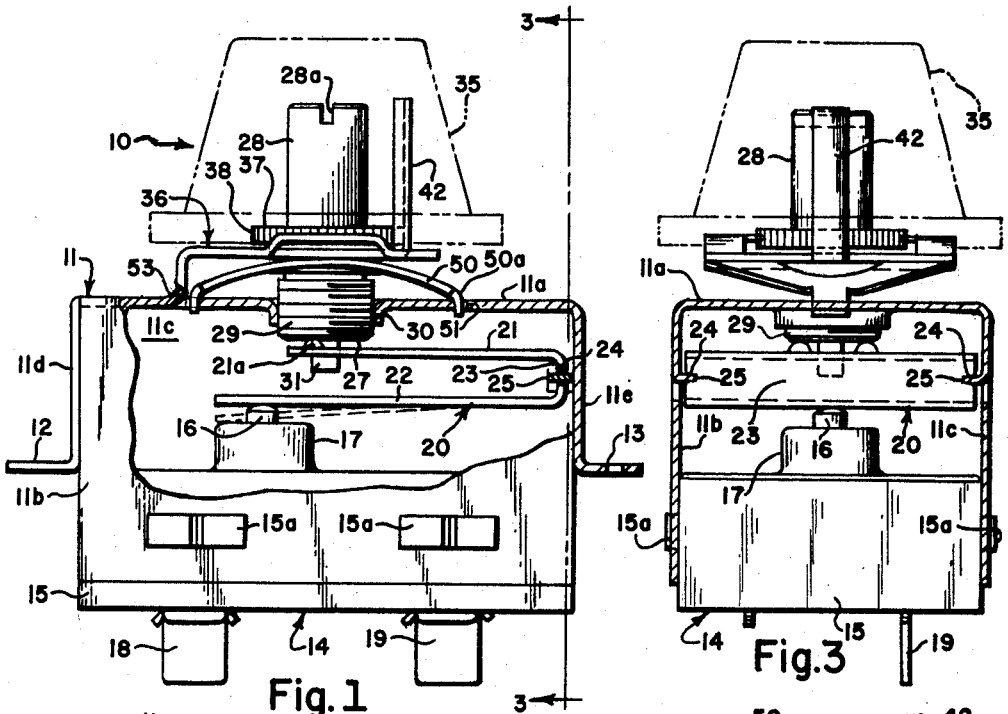
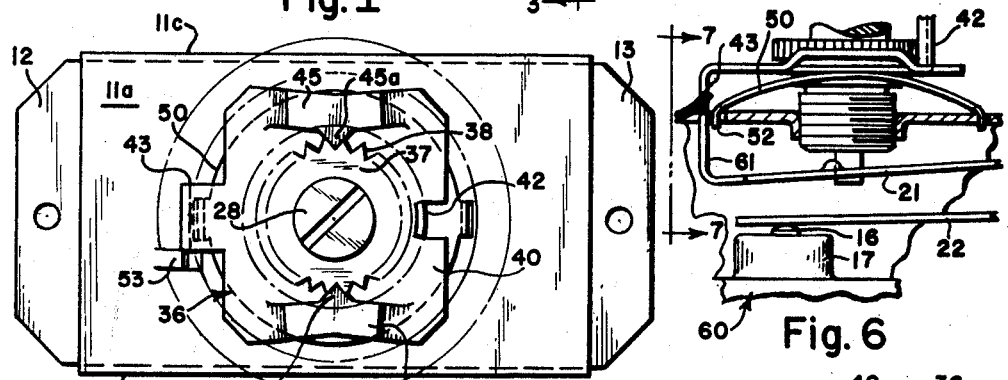
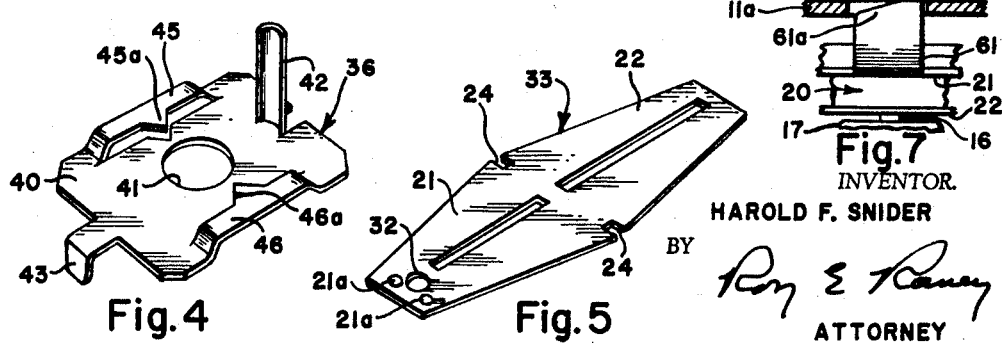
INVENTOR.
HAROLD F. SNIDER
BY
*Roy E. Raney*
ATTORNEY ated Dec. 29, 1964

United States Patent Office 3,163,043
Patented Dec. 29, 1964

3,163,043
THERMALLY RESPONSIVE CONTROL
APPARATUS
Harold F. Snider, Goshen, Ind., assignor to Ranco Incorporated, Columbus, Ohio, a corporation of Ohio
Filed Oct. 19, 1961, Ser. No. 146,236
2 Claims. (Cl. 73—363.5)

This invention relates to improvements in thermally responsive control apparatus of the type comprising a control device such as an electric switch and thermally responsive power means such as a bimetal element for operating the switch to perform a control function in accordance with variations in temperature. More particularly, the present invention is directed to a control apparatus which is well suited to thermostatic control of electric motor driven components of refrigerating apparatus, for example in the form of domestic refrigerators comprising an evaporator or cooling coil which is maintained at a temperature considerably below that of the food compartment to be tempered and having an electric fan which induces a flow of air over the evaporator and into the food compartment, the fan being intermittently energized by a thermostatic control apparatus as necessary to maintain the food compartment at a desired temperature.

It is a principal object of the present invention to provide an improved thermostatic control apparatus which may be located in the space or compartment to be tempered, and may be manually adjusted by a control handle or knob having an index mark or graduations thereon to select a desired temperature within a range of temperatures, and which apparatus may be simply and readily "set" or calibrated after assembly at the factory to accurately establish at least one point or temperature in the range of temperatures with respect to the corresponding graduation or position of the control knob.

It is another object of the present invention to provide a thermostatic control apparatus of the above mentioned character comprising a U-shaped bimetal power element having one leg acting against an actuator member of a switch mechanism and having the other leg reacting against adjustable stop means by which the temperature at which the switch device will be actuated may be manually preselected, and wherein the manually adjustable temperature selecting means comprises a rotatable control shaft for shifting the stop against which one leg of the bimetal reacts and a shaft encircling drive member which is rotatable by the control knob, the shaft and drive member being provided with cooperable keying means which permit the shaft to be rotated independently of the drive member prior to calibration so that by subjecting the apparatus to a known temperature and holding the drive member in a predetermined position while rotating the shaft until the control function occurs which is to correspond to that temperature, and then keying the shaft and drive member together, there is established a position for the drive member and control knob at which the apparatus will respond to the known temperature. In one preferred embodiment of the control apparatus, the keying means comprises a toothed member on the shaft and projections on the drive member, which projections may be bent into engagement with the toothed member upon calibration.

Another object of the invention is the provision of a control apparatus having a drive member keyed to a control shaft in the manner referred to in the preceding paragraph and comprising a portion which cooperates with a stop member to limit rotation of the drive member and shaft, and which also cooperates with a projection on the bimetal power element to actuate the apparatus to an "off" condition regardless of the temperature experienced by the control apparatus.

The invention resides in certain constructions and arrangements of parts which provide the foregoing objects and advantages as well as others which will become apparent from the following detailed description of presently preferred embodiments of the invention, read in conjunction with the accompanying sheet of drawings forming a part of this specification, and in which FIG. 1 is an elevational view of a control apparatus embodying this invention, with a portion of the casing thereof broken away to reveal interior parts;

FIG. 2 is a top plan view of the control apparatus of FIG. 1;

FIG. 3 is a sectional view taken substantially along line 3—3 of FIG. 1;

FIG. 4 is an enlarged perspective view of a drive component forming part of the control apparatus;

FIG. 5 is a plan view of a blank from which a bimetal power element is formed;

FIG. 6 is a fragmentary sectional view illustrating a modified form of control apparatus embodying the invention; and FIG. 7 is a view taken substantially along line 7—7 of FIG. 6.

Although control apparatuses embodying the present invention may be utilized in thermostatic control of other functions, by way of example the invention will be described hereinafter with reference to use in the control of a fan forming part of a refrigeration apparatus (not shown) in which the fan induces a flow of air over a cooling coil and into the food compartment of a refrigerator, the fan being energized and deenergized as necessary to maintain a predetermined temperature in the food compartment.

In the form of the invention illustrated in FIGS. 1 through 5, there is provided a thermostatic control apparatus, generally indicated at 10, and comprising a rectangular housing or frame 11 which is preferably formed as a sheet metal stamping. Frame 11 comprises a top wall 11a, side walls 11b and 11c, and end walls 11d and 11e. A pair of mounting ears 12 and 13 are formed to extend from end walls 11d and 11e, and a control device in the form of a switch mechanism 14 is mounted between side walls 11b and 11c to close the side of frame 11 opposite top wall 11a. Switch device 14 comprises a casing 15 formed of a rigid insulating material such as "Bakelite" and is retained between side walls 11b and 11c by lugs 15a extending through complementary openings in the side walls. Switch device 14 is preferably of the snap acting, normally closed variety having an actuator member in the form of an actuator button 16 extending from a boss 17 into the interior of frame 11. The details of the snap switch are not shown as they are well known in the art, one example being the subject of U.S. Patent 2,172,673. A pair of blade type terminal members 18 and 19 extend from switch casing 15 and are adapted to connect the switch into an electrical circuit to be controlled, for example an energizing circuit for the mentioned fan. Of course, it will be understood that any suitable switch mechanism may be utilized which has an actuator button such as 16 which causes either opening or closing of the switch upon depression thereof.

Thermally responsive power means are provided within frame 11 for acting upon actuator button 16 to open and close the switch in accordance with increases and decreases in temperature to predetermined temperature levels in the food compartment in which the control apparatus 10 may be mounted to control the mentioned fan. The thermally responsive power means comprises a U-shaped bimetal element 20 having an upper leg 21 and a lower leg 22 joined by a yoke or bight portion 23. Bimetal element 20 is pivoted between frame side walls 11b and 11c by engagement of notches 24, formed in the bight 23 of the bimetal element, with lugs 25 struck out of the side walls and extending inwardly of the frame as is best seen in FIG. 3. The free end of bimetal leg 22 engages switch actuator button 16 while the free end of bimetal leg 21 has projections 21a engaging a shoulder 27 formed on the inner end of a control shaft 28.

Control shaft 28 has a threaded portion 29 extending through a threaded opening 30 formed in frame wall 11a. The inner end of shaft 28 has a reduced portion forming a stud 31 which extends through an opening 32 in bimetal leg 21 to maintain alignment of the bimetal element 20 with the control shaft and the pivot lugs 25. Bimetal element 20 is formed from a blank 33 such as that illustrated in FIG. 5, the blank comprising a composite metal material, one side of which has a higher coefficient of expansion. It will be recognized, therefore, that changes in temperature experienced by bimetal element 20 will cause distortion thereof, with decreases in temperature tending to cause legs 21 and 22 thereof to spread apart, and increases in temperature causing the legs to move toward one another. This distortion is utilized to move actuator button 16 to operate switch 14 which may be utilized, for example, to control energization of a fan which circulates air in a refrigerator food compartment over a relatively cold evaporator unit.

Thus, assuming the control apparatus 10 to be located in the food compartment to be tempered and which compartment is at its desired minimum temperature, for example 40° F., the bimetal element 20 will be distorted to its dotted line position of FIG. 1 in which position leg 22 acts against actuator button 16 and leg 21 reacts against shoulder 27 of shaft 28 to hold switch 14 in an open condition in which the air circulating fan is de-energized. As the temperature of the food compartment rises to a predetermined maximum temperature, of 45° F. for example, bimetal element 20 will resume its full line position in which leg 22 permits actuator button 16 to move to a position in which switch 14 is actuated to close a fan energizing circuit. Energization of the fan will cause a circulation of air over the evaporator thereby cooling the food compartment and causing bimetal 20 to distort toward its dotted line position. Thus, the fan may be cycled as necessary to maintain the refrigerator food compartment between predetermined temperature limits.

The temperatures at which the switch 14 will be actuated may be selected by rotating shaft 28 to raise or lower the shoulder 27, against which leg 21 reacts, so as to respectively decrease or increase the temperatures at which the control apparatus will operate. Shaft 28 may be rotated by means of a graduated knob 35 which is coupled to the shaft by a drive member 36 which permits ready calibration of the apparatus in a manner which will become apparent as the description proceeds.

Control shaft 28 comprises a serrated flange or ring 37 presenting a series of radially extending teeth 38 about the circumference thereof. Drive member 36, best illustrated in FIG. 4, comprises a rectangular plate portion 40 having a central control shaft receiving opening 41, a drive arm 42 extending upwardly from one side of the plate portion, and a lug 43 extending downwardly from the other side of the plate portion. A pair of off-set or raised portions 45 and 46 are struck from plate portion 40 and present inwardly directed projections 45a and 46a, respectively.

Drive member 36 is assembled on shaft 28 so as to encircle the shank portion thereof below toothed ring 37. A bowed drag spring 50 surrounds shaft 28 between drive member 36 and frame wall 11a, with one end portion 50a engaging an opening 51 in frame wall 11a, the other end portion 50b engaging an opening 52 in that frame wall, and the medial portion of the drag spring bearing upwardly against the drive member. Drive arm 42 extends upwardly into a slot or groove in knob 35, when the latter is assembled on shaft 28, and it will be recognized that rotation of knob 35 will effect rotation of drive member 36. Stop lug 43 of the drive member is adapted to cooperate with an upstanding stop 53, struck upwardly from frame wall 11a, to limit rotation of drive member 36.

When drive member 36 is assembled on shaft 28, projections 45a and 46a are sufficiently spaced to remain out of engagement with teeth 38 of flange 37. Shaft 28, which has a screw driver slot 28a is, at the time of assembly, rotatable independently of drive member 36. The apparatus 10 may therefore be calibrated by subjecting the apparatus to a predetermined temperature and holding drive member 36 with stop lug 43 against stop 53 while rotating shaft 28 with a suitable tool until switch 14 is actuated as desired for the predetermined temperature. Raised portions 45 and 46 of the drive member are then crimped or bent inwardly toward one another to bring projections 45a and 46a into meshing engagement with teeth 38 of shaft flange 37. Drive member 36 is thereby locked or keyed to shaft 28 for effecting rotation of the latter when drive arm 42 is moved by knob 35. It will be recognized that the described construction permits a predetermined relationship to be established between a graduated knob and the position of shaft 28 and that suitable graduations on the knob may thereafter be utilized to select a predetermined temperature at which switch 14 will be actuated.

It is sometimes desirable to provide means for actuating the control apparatus to an off position regardless of th temperature experienced thereby, and for this purpose a modified form of control apparatus 60 is illustrated in FIGS. 6 and 7, in which views parts corresponding to those of apparatus 10 have corresponding reference numbers. In this form of the invention, however, bimetal leg 21 has been provided with an extension in the form of an upturned arm 61 having an end 61a normally projecting upwardly through opening 52 in frame wall 11a adjacent stop member 53. The end 61a of arm 61 is provided with a sloping cam surface 62 which is adapted to be engaged by stop lug 43 of drive member 36 when the latter is brought to a position engaging stop member 53. Stop lug 43 acts as a cam against surface 62 to depress arm 61 causing bimetal element 20 to pivot downwardly about pivot lugs 25 and to thereby depress actuator button 16 to actuate switch 14 to an open or off position.

Although the invention has been described with detailed reference to several specific control apparatuses embodying the invention, it will be understood that the invention is not limited thereto, but rather the invention includes all those modifications, adaptations, and uses as are reasonably embraced by the scope of the claims hereof.

Having thus described my invention, I claim:

1. A control apparatus comprising a frame having side walls joined by a top wall, a control device mounted between the free ends of said side walls, said control device having an actuator member movable to effect a control function, a control shaft extending through said top wall and rotatable therein, a thermally responsive power element disposed between the inner end of said control shaft and said actuating member, said power element being adapted to react against said control shaft function at a predetermined temperature, the inner end of said control shaft being operative upon rotating of said shaft to move said one leg to select said predetermined temperature, and a shaft drive member comprising a plate encircling said shaft and adapted to be rotated by a control knob, said shaft having a flange overlying said plate and having radially extending teeth, said plate having sections presenting projections extending toward said teeth, said projections being spaced to permit free rotation of said shaft and flange with respect to said plate to select an angular relationship therebetween, said sections being deformable to bring said projections into engagement with said teeth for keying said shaft and plate together in a selected relationship.

2. In a control device having a frame and a rotatable control shaft extending from said frame to change control characteristics of said device,
   (a) a flange on said shaft, said flange being spaced from said frame and having a series of radially extending teeth on the periphery thereof,
   (b) a drive plate disposed between said flange and said frame in encircling relation to said shaft and rotatable with respect to said frame about the axis of said shaft,
   (c) said plate having a pair of deformable parallel metal strips lying in the plane of said flange on diametrically opposite sides thereof, said deformable strips having teeth directed inwardly toward the teeth of said flange,
   (d) said teeth on said strips being clear of said teeth on said flange to permit rotation of said shaft with respect to said drive plate to establish a desired positional relationship therebetween, and
   (e) said strips being deformable by lateral forces toward one another to bring the teeth thereon into meshing engagement with the teeth of said flange, whereby rotation of said plate will effect rotation of said shaft while maintaining said relation therebetween.

References Cited in the file of this patent

UNITED STATES PATENTS

| | | |
|---|---|---|
| 1,951,228 | Woodward | Mar. 13, 1934 |
| 2,236,478 | Gough | Mar. 25, 1941 |
| 2,276,753 | Tinnerman | Mar. 17, 1942 |
| 2,851,556 | Van Valkenburg | Sept. 9, 1958 |

FOREIGN PATENTS

| | | |
|---|---|---|
| 607,861 | Germany | Jan. 9, 1935 |